Patented May 17, 1927.

1,628,792

UNITED STATES PATENT OFFICE.

ELDON L. LARISON, FREDERICK F. FRICK, AND RAYMOND J. CARO, OF ANACONDA, MONTANA, ASSIGNORS TO ANACONDA COPPER MINING COMPANY, OF ANACONDA, MONTANA.

PROCESS OF MAKING MONOAMMONIUM PHOSPHATE.

No Drawing.  Application filed May 3, 1926. Serial No. 106,546.

The gases produced by the destructive distillation of coal in the manufacture of coke contain a small amount of ammonia which is ordinarily recovered as ammonium sulfate by scrubbing the gases with sulfuric acid. The ammonium sulfate made in this way is used chiefly as a fertilizer and is valued by its available nitrogen content, each one percent of ammonia in the product being rated as one unit of plant food. The product ordinarily contains 25% ammonia or 25 units of plant food, the sulfur and oxygen content being of negligible value as a fertilizer.

An object of the present invention is the recovery of the ammonia content of coke oven gases and the like in a form having a higher plant food value than the ammonium sulfate product referred to. Logically this may be accomplished by combining the ammonia with an acid component such as nitrate or phosphate which itself has a plant food value or with which ammonia forms a compound of which the ammonia constitutes a greater proportion than in ammonium sulfate.

In ammonium phosphates, for instance, both the $NH_3$ content and the $P_2O_5$ content are rated as plant foods, but the di- and tri-ammonium phosphates are unstable compounds which are not suitable for fertilizer purposes and the production of mono-ammonium phosphate involves certain technical difficulties. For instance, if a gas consisting of or containing ammonia such as coke oven gases is passed into a crude solution of phosphoric acid (made by acidulating phosphate rock with sulfuric acid and separating the calcium sulfate and other insoluble matter) of such concentration as to produce solutions which are saturated with respect to mono-ammonium phosphate a sludge results which is so thick that the absorption of ammonia is difficult. This is due in part to the fact that the mono-ammonium phosphate is very soluble in water making its super saturated solution very thick and viscous and in part to the fact that iron and aluminum compounds present in the crude phosphoric acid are precipitated by the ammonia as gelatinous hydroxides. Besides it is difficult to regulate the proportions of ammonia and phosphoric acid in the reaction mixture so that only the stable mono-ammonium salt is formed.

A further object of the invention therefore is to devise a process for the production of mono-ammonium phosphate whereby the difficulties referred to are overcome. The process of the invention is designed primarily for the production of more or less crude mono-ammonium phosphate suitable for use as a fertilizer from inexpensive starting materials such as coke oven or similar ammonia containing gases and crude phosphoric acid such as that produced by the acidulation of phosphate rock, but as will be apparent the principles of the invention are applicable in the use of other starting materials as, for instance, the ammonia containing gases produced by the synthesis of hydrogen and nitrogen and by the decomposition of cyanamide with steam.

We have found that mono-ammonium phosphate may be prepared satisfactorily by treating a solution of phosphoric acid, such as the crude solution produced by the acidulation of phosphate rock, with ammonia or ammonia containing gases such as coke oven gases by combining the ammonia and the phosphoric acid in such proportions, about 1 part by weight of $NH_3$ to 2.8 parts by weight of $P_2O_5$ that about half of the phosphoric acid is combined as mono-ammonium phosphate and the remainder is combined as the di-ammonium phosphate and treating the resulting unstable salt in a separate operation with phosphoric acid in quantity sufficient to convert its di-ammonium phosphate content to the mono-ammonium phosphate.

The first step of the process is conveniently carried out in the scrubbers or saturators customarily employed for the production of ammonium sulfate from coke oven gases although it will be understood that any suitable apparatus for gas and liquid contact may be employed.

The following description of a specific procedure illustrates the invention:

The saturator is charged with a suitable volume of crude phosphoric acid solution of a concentration giving a hydrometic test of about 36° Bé. preferably warmed to about 50° C. Coke oven gas is passed into the saturator until ammonia amounting to about 1 part by weight of ammonia for each 2.8 parts of $P_2O_5$ in the scrubbing solution, i. e., a quantity sufficient to convert about one-half of the phosphoric acid content of the scrubbing liquid to the mono-ammonium phosphate and the remainder to the di-ammonium phosphate has been absorbed. When this point is reached, the gas flow being continued, a continuous removal of the ammoniated pulp from the saturator and a continuous supply of crude phosphoric acid to the saturator are started and maintained at such rates that the ratio of $NH_3$ and $P_2O_5$ and the volume of liquid in the saturator are maintained, the operation being continuous. For controlling the operation of the saturator so as to maintain the $NH_3$—$P_2O_5$ ratio at about 1:2.8 samples of the saturator liquid are withdrawn from time to time, filtered, and treated with a standard acid such as sulfuric acid using methyl orange as the indicator. Methyl orange is yellow when the ratio of ammonia to phosphoric acid is greater than that in mono-ammonium phosphate and turns red when this excess of ammonia is consumed by the titrating acid. The supply of crude phosphoric acid and the removal of pulp may, of course, be varied as required to maintain the stated conditions.

It has been found that a saturator liquid of the composition referred to absorbs ammonia readily and efficiently and the composition of the liquid is readily controlled in continuous operation. The ratio of $NH_3$ to $P_2O_5$ in the scrubber liquid may of course vary with reasonable limits. The ammoniated pulp withdrawn from the saturator is mixed with phosphoric acid in quantity sufficient to convert the unstable di-ammonium phosphate in it into the stable mono-ammonium phosphate and the resulting mono-ammonium phosphate sludge is dried in a rotary or other suitable drier to such a moisture content that it may be ground and applied to soil by means of the usual fertilizer distributing machinery.

Mono-ammonium phosphate when pure contains 14.78% of $NH_3$ and 61.74% of $P_2O_5$ or 76.52 units of plant food and the crude product produced as described approaches this figure. The crude mono-ammonium phosphate may of course be refined and purified, for instance, by diluting the neutralized pulp with water in quantity sufficient to dissolve the mono-ammonium phosphate, filtering the solution and crystallizing out the mono-ammonium phosphate by concentration.

We claim:

1. Process of making mono-ammonium phosphate which comprises combining ammonia and phosphoric acid in the ratio of approximately 1 part by weight of $NH_3$ to 2.8 parts by weight of $P_2O_5$ and treating the resulting mixture of mono- and di-ammonium phosphate with phosphoric acid in quantity sufficient to convert the di-ammonium phosphate into the mono-ammonium phosphate.

2. Process of making mono-ammonium phosphate which comprises scrubbing a gas containing ammonia with a solution of phosphoric acid until the ratio of $NH_3$ to $P_2O_5$ in the scrubbing liquid is about 1 to 2.8 by weight.

3. Process of making mono-ammonium phosphate which comprises scrubbing a gas containing ammonia with a liquid containing mono- and di-ammonium phosphate and maintaining the ratio of $NH_3$ to $P_2O_5$ in the scrubbing liquid at about 1 to 2.8 by weight.

4. Process of making mono-ammonium phosphate which comprises continuously contacting a stream of gas containing ammonia with a scrubbing liquid containing mono- and di-ammonium phosphate and maintaining the ratio of $NH_3$ to $P_2O_5$ in the scrubbing liquid at about 1 to 2.8 by weight by continuously withdrawing scrubbing liquid and continuously supplying phosphoric acid.

5. Process of making mono-ammonium phosphate which comprises scrubbing a gas containing ammonia with a crude solution of phosphoric acid of about 36° Bé. containing iron and aluminum compounds obtainable by acidulating phosphate rock with sulfuric acid until the ratio of $NH_3$ to $P_2O_5$ in the scrubbing liquid is about 1 to 2.8 by weight.

6. Process of making mono-ammonium phosphate which comprises scrubbing coke oven gases containing ammonia with a solution containing mono- and di-ammonium phosphate, maintaining the ratio of $NH_3$ to $P_2O_5$ in the scrubbing liquid at about 1 to 2.8 by weight by the removal of ammoniated sludge from and the addition of phosphoric acid solution of about 36° Bé. to the scrubbing liquid, and treating the withdrawn sludge with phosphoric acid in quantity sufficient to convert its di-ammonium phosphate content into mono-ammonium phosphate.

7. Process of making a mono-ammonium phosphate product suitable for use as fertilizer which comprises scrubbing coke oven gases containing ammonia with a liquid containing $NH_3$ and $P_2O_5$ in about the ratio of 1 to 2.8 by weight, maintaining the volume and composition of the scrubbing liquid by the withdrawal of ammoniated sludge and the addition of crude phosphoric acid of about 36° Bé. containing iron and aluminum compounds obtainable by the acidulation of phosphate rock with sulfuric acid, treating the withdrawn sludge with phosphoric acid in quantity sufficient to convert the di-ammonium phosphate content thereof into mono-ammonium phosphate, and drying the resulting product.

In testimony whereof, we affix our signatures.

ELDON L. LARISON.
FREDERICK F. FRICK.
RAYMOND J. CARO.